UNITED STATES PATENT OFFICE.

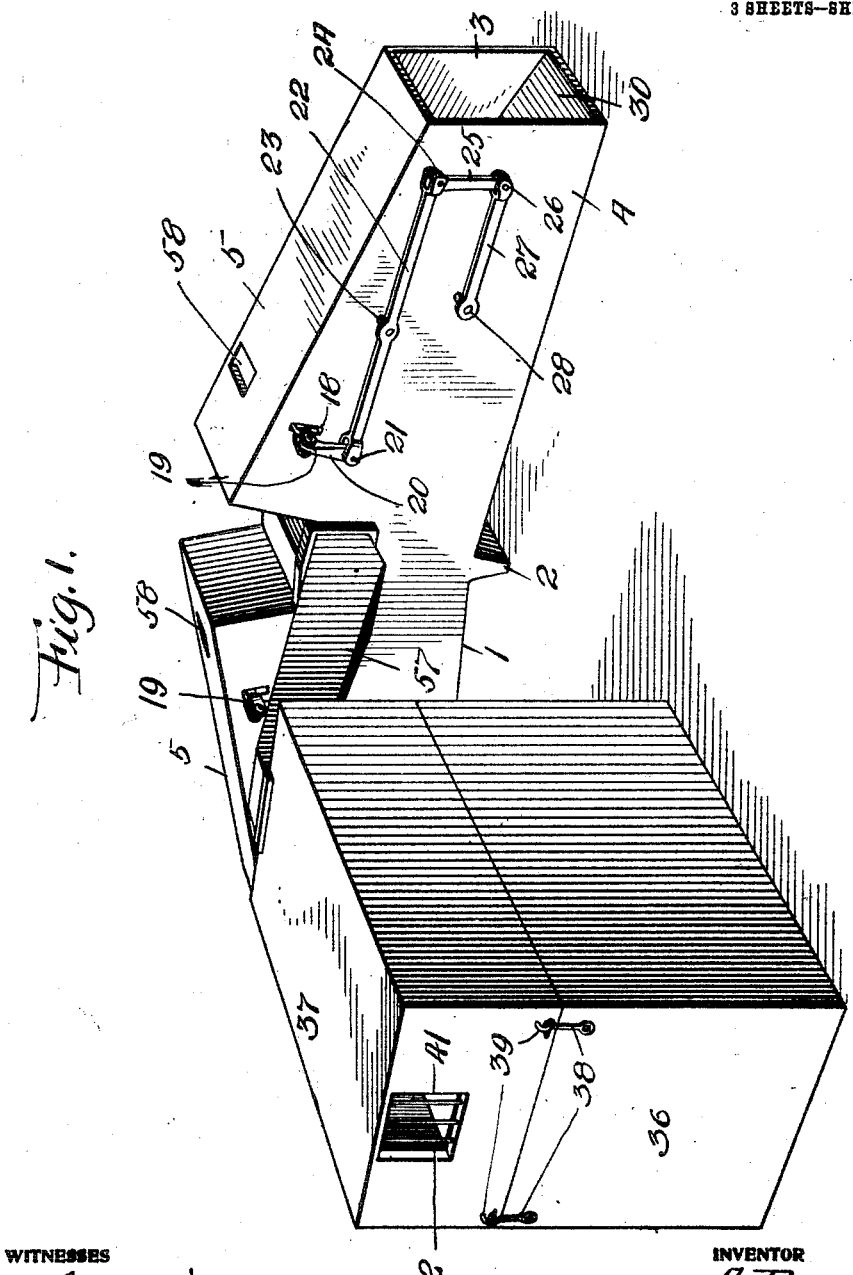

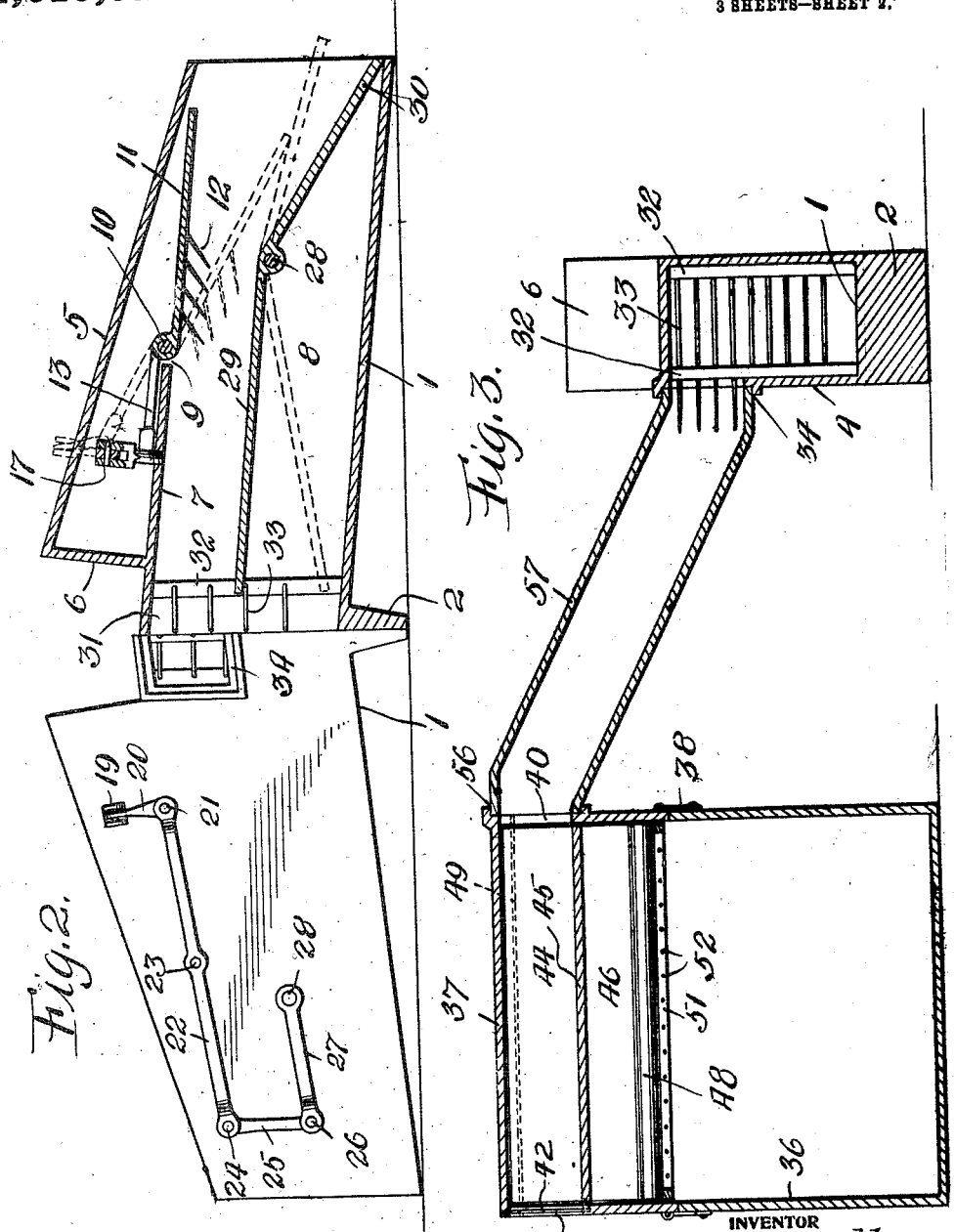

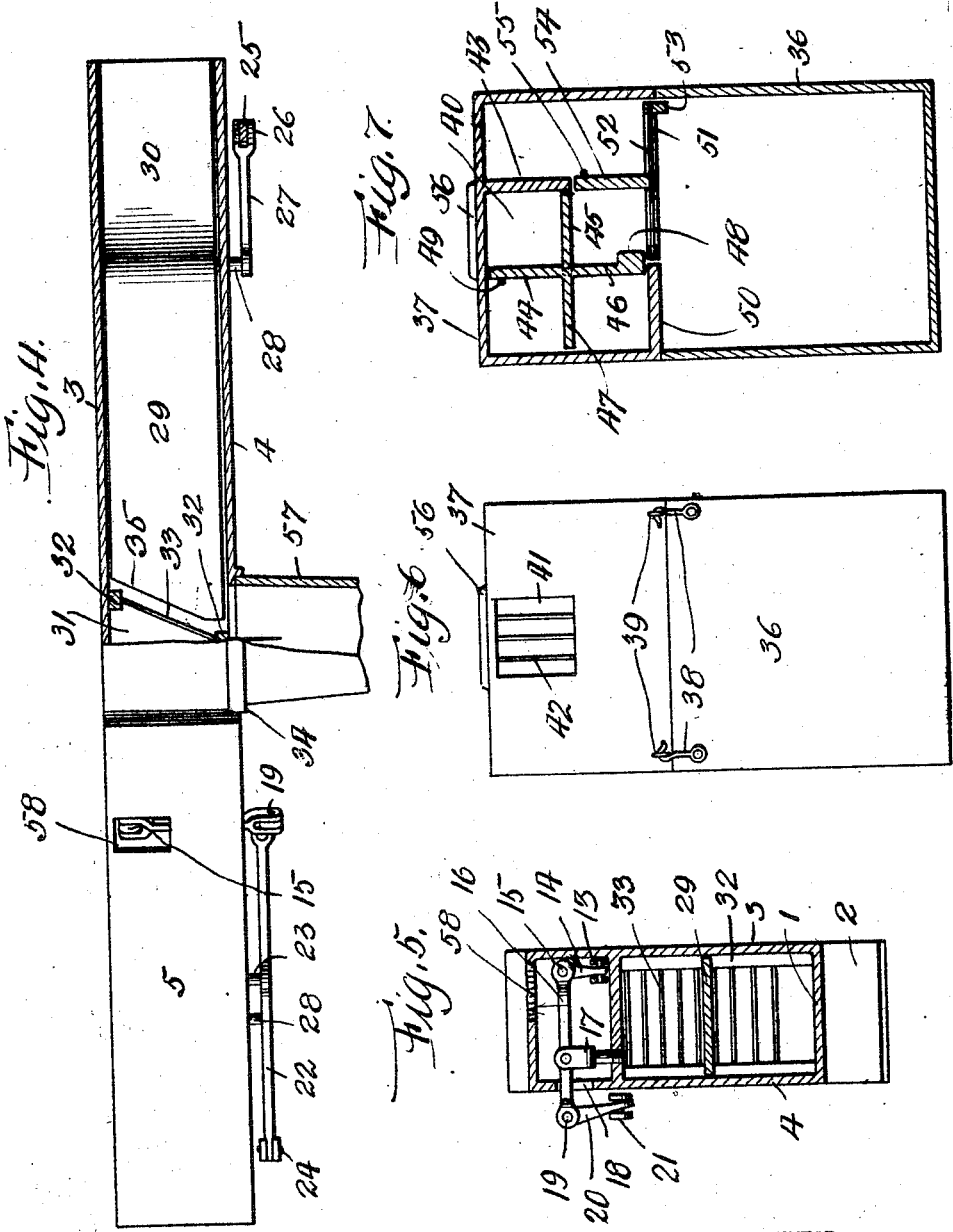

ANDREW PAULL, OF SEWARD, PENNSYLVANIA.

TRAP.

1,019,518.  Specification of Letters Patent.  Patented Mar. 5, 1912.

Application filed September 28, 1911. Serial No. 651,681.

*To all whom it may concern:*

Be it known that I, ANDREW PAULL, a citizen of the United States of America, residing at Seward, in the county of Westmoreland and State of Pennsylvania, have invented certain new and useful Improvements in Traps, of which the following is a specification, reference being had therein to the accompanying drawing.

This invention relates to traps especially designed for rodents and for use in buildings, wharves and other structures infested with rodents.

The object of my invention is to provide a trap having a series of passages provided with tiltable platforms that eventually entrap a rodent in a receptacle or housing designed for that purpose.

My invention aims to provide a trap consisting of a main housing having branches that permit of more than one rodent entering the trap at a time. The branch housings are provided with tiltable platforms and closures that prevent a rodent from escaping after having entered one of the branch housings. An inclosed bridge permits of a rodent passing from one of the branch housings to the main housing, in which the rodent is precipitated and prevented from escaping.

The invention further aims to provide a trap with dark passages that will entice a rodent into the various parts of the trap, without the nature of such passages being disclosed until the rodent is in such position that escape is impossible.

The invention further aims to accomplish the above results by a combination of elements that will be hereinafter specifically described and then claimed.

Reference will now be had to the drawings, wherein like numerals denote corresponding parts throughout the several views, in which:—

Figure 1 is a perspective view of the trap. Fig. 2 is a side elevation of the branch housings with one of said housings partly broken away and partly in section. Fig. 3 is a longitudinal sectional view of the trap. Fig. 4 is a plan of the branch housings partly broken away and partly in section. Fig. 5 is a vertical cross-sectional view of one of the branch housings. Fig. 6 is an end view of the main housing; and Fig. 7 is a vertical cross-sectional view of the same.

The branch housings comprise inclined bottom plates 1 having the upper ends thereof supported by a transverse leg 2. Each branch housing has vertical side walls 3 and 4 connected by a top plate 5 and end wall 6 and a partition 7. The partitions 7 are arranged in parallelism with the bottom plates 1 and coöperate with said plates and the walls 3 and 4 in providing inclined longitudinal passages 8. The partitions 7 are of a less length than the top plates 5, thereby providing openings 9. Arranged transversely of said openings, adjacent to the ends of the partition 7, are rock shafts 10, said shafts being journaled in the walls 3 and 4.

Mounted upon the shafts 10 within the openings 9 are closures 11 having the under sides thereof provided with prongs 12. The pivoted end of each closure has a bifurcated arm 13 pivotally connected by a link 14 and a pin 15 to a fulcrumed arm 16, carried by a bearing 17 mounted in partition 7. The arm 16 extends through an opening 18 provided therefor in the wall 4 and is pivotally connected by a pin 19, a link 20 and a pin 21 to a rock lever 22. The rock lever 22 is pivotally mounted upon a stub pin 23 carried by the wall 4. The outer end of the rock lever 22 is bifurcated and pivotally connected by a pin 24, and a link 25 to the bifurcated end 26 of a crank 27. This crank is mounted upon the protruding end of a shaft 28 journaled in the walls 3 and 4. Mounted upon the shaft 28 within the passage 8 is a tiltable platform 29 having an outer inclined end 30.

The confronting ends of the partition 7 and the walls 3 and 4 of the branch housings provide a central chamber 31 having vertical posts 32. These posts are arranged in a triangular form and are connected by bars 33, said bars forming two angularly disposed walls converging toward a flanged opening 34 at the juncture of the side walls 4 of the branch housings. The inner ends of the tiltable platform 29 are cut away, as at 35, to provide clearance for the bars 33. The bars 33 of one wall are staggered relatively to the bars of the other wall and the uppermost bars of both walls extend into the opening 34.

The main housing of the trap comprises a box 36 having a detachable lid or cover 37 retained in engagement with the box 36 by hooks 38 and staples 39, carried by the box and lid, respectively. The lid 37 has the ends thereof, adjacent to the top thereof, provided with rectangular openings 40 and 41, the latter being closed by bars 42. The end walls of the lid 37 are connected by a longitudinal partition 43 of less depth than the side walls of the lid 37, said partition being located at one side of the openings 40 and 41.

Revolubly mounted between the end walls of the lid 37 is a longitudinal paddle wheel having paddles 44, 45, 46 and 47. The paddles 44 and 45 coöperate with the partition 43 and the top of the lid 37 in providing a longitudinal passage, and the lower edge of the paddle 46 is weighted, as at 48, to normally maintain the paddles 44 and 45 at right angles to the top of the lid 37 and the partition 43. The paddle wheel is limited in its movement by a longitudinal rod 49 connecting the end walls of the lid 37. The paddle 44 engaging said rod limits the movement of the wheel in one direction and the paddle 47 engaging said rod limits the movement of the wheel in the opposite direction.

The lid has a horizontal longitudinal partition 50 with the edge of said partition at the weighted edge of the paddle 46, thereby providing an open space in the lid 37 between the paddles 45 and 46. Tiltably mounted in this space is a platform consisting of a rectangular frame 51 having transverse bars 52. The frame 51 has one edge thereof weighted, as at 53, and said frame is provided with central longitudinal partition 54 adapted to engage a longitudinal rod 55, carried by the end walls of the lid and limit the tilting movement of the platform in one direction.

The opening 40 in the end wall of the lid 37 is flanged, as at 56, and connecting this flanged opening and the opening 34 of the branch housings is an inclined and closed bridge 57, having the ends thereof fitted in the openings 34 and 56.

A suitable bait can be located in the chamber 31 and when a rodent enters the passage 8 upon the tiltable platform 29, the inner end of the platform is lowered by the weight of a rodent's body. The tilting movement of the platform 29 actuates the elements 28, 27, 25, 22, 20, 16, 14, 13 and 11, placing the closure 11 in a lowered position, thereby retaining the rodent within the passage 8. The prongs 12 prevent the rodent from attempting to raise the closure 11. The rodent cannot enter the chamber 31 and escape through adjoining branch housings, consequently, the bridge 57 is the only outlet for the rodent. When the rodent passes through the opening 40 at the upper end of the bridge on to the paddle 45, the paddle wheel is rotated by the weight of the rodent and deposits the rodent on to the tiltable platform in the lid 37, and from this platform the rodent is precipitated into the box 36 and is entrapped. The paddle wheel and the tiltable platform immediately assume their normal position and this is also true in connection with the platform 29, when the inner end thereof is released of the weight of a rodent's body. The platform 29 is balanced to a nicety, whereby, immediately upon the rodent's body resting upon the inner end of the platform, said platform is tilted and the closure 11 lowered.

The opening 41 in the end wall of the lid 37 encourages a rodent to enter the lid 37 of the box, and after the rodent has been deposited in the box the box can be disconnected from the bridge 57 and carried to a suitable place where the rodent can be exterminated.

To provide clearance for a movement of each of the fulcrumed arms 16, the top plates 5 of the branch housings are provided with openings 58.

It is thought that the operation and utility of the trap will be apparent without further description, and I would have it understood that the structural elements herein disclosed can be varied or changed without departing from the scope of the appended claims.

What I claim is:—

1. A trap comprising a main housing, a pair of oppositely disposed branch housings communicating with each other at their inner end, an inclined bridge for establishing communication between said branch housings and said main housing, a partition in each of said branch housings, a platform mounted in each of said branch housings and having its outer portion disposed at an inclination with respect to its inner portion, a movable pivot for each of said platforms, a closure pivotally connected in each of said branch housings and in proximity to said partition, arranged over a portion of a platform and provided with depending prongs, means supported by each of said partitions and extending from a branch housing and connected to a closure for shifting it, the operative connections between said means and the movable pivots of said platforms for operating said means when the platforms are tilted whereby said closures will be shifted to close the branch housings when the inner portions of the platforms are lowered.

2. A trap comprising a main housing, a pair of oppositely disposed branch housings communicating with each other at their inner end, an inclined bridge for establishing communication between said branch housings and said main housings, a partition in each of said branch housings, a platform mounted in each of said branch housings and having its outer portion disposed at an inclination with respect to its inner portion, a movable pivot for each of said platforms, a closure pivotally connected in each of said branch housings and in proximity to said partition, arranged over a portion of a platform and provided with depending prongs, means supported by each of said partitions and extending from the branch housing and connected to the closure for shifting it, operative connections between said means and the movable pivots of said platforms for operating said means when the platforms are tilted whereby said closures will be shifted to close the branch housings when the inner portions of the platforms are lowered, a lid for said main housing, a longitudinally extending paddle wheel within said lid, and a tiltable platform arranged within said lid and coöperating with said paddle wheel for entrapping rodents in the bottom of said main housing.

3. A trap comprising a main housing, a detachable lid carried thereby, a pair of oppositely disposed branch housings, an inclined detachable bridge for establishing communication between the inner ends of said branch housings and said lid, a tiltable platform arranged in each of said branch housings and having a movable pivot journaled in the side wall of its respective branch housing, each of said platforms including an outer portion disposed at an inclination with respect to its inner portion, a closure arranged within each of the branch housings above said platform and capable of being shifted to closed position when the inner portion of the platform is moved downwardly, downwardly depending prongs carried by said closures, operative connections between said pivots and said closures for operating these latter simultaneously with the tilting of said platforms, and means within the lid of the main housing for entrapping rodents in the bottom of the main housing.

4. A trap comprising a main housing, a detachable lid carried thereby, a pair of oppositely disposed branch housings, an inclined detachable bridge for establishing communication between the inner ends of said branch housings and said lid, a tiltable platform arranged in each of said branch housings and having a movable pivot journaled in the side wall of its respective branch housing, each of said platforms including an outer portion disposed at an inclination with respect to its inner portion, a closure arranged within each of the branch housings above said platform and capable of being shifted to closed position when the inner portion of the platform is moved downwardly, downwardly depending prongs carried by said closures, operative connections between said pivots and said closures for operating these latter simultaneously with the tilting of said platforms, a paddle wheel arranged within the lid of the main housing, and a tiltable platform within said lid and coöperating with said tiltable wheel for entrapping rodents in the bottom of the main housing.

In testimony whereof I affix my signature in the presence of two witnesses.

ANDREW PAULL.

Witnesses:
MAX SROLOVITZ,
CHRISTINA T. HOOD.